June 21, 1966  G. S. JANES ETAL  3,256,687
HYDROMAGNETICALLY OPERATED GAS ACCELERATOR PROPULSION DEVICE
Filed July 31, 1958  5 Sheets-Sheet 1

GEORGE SARGENT JANES
RICHARD M. PATRICK
INVENTORS

BY *Alden D. Redfield*
*Warren Hunt*
ATTORNEYS

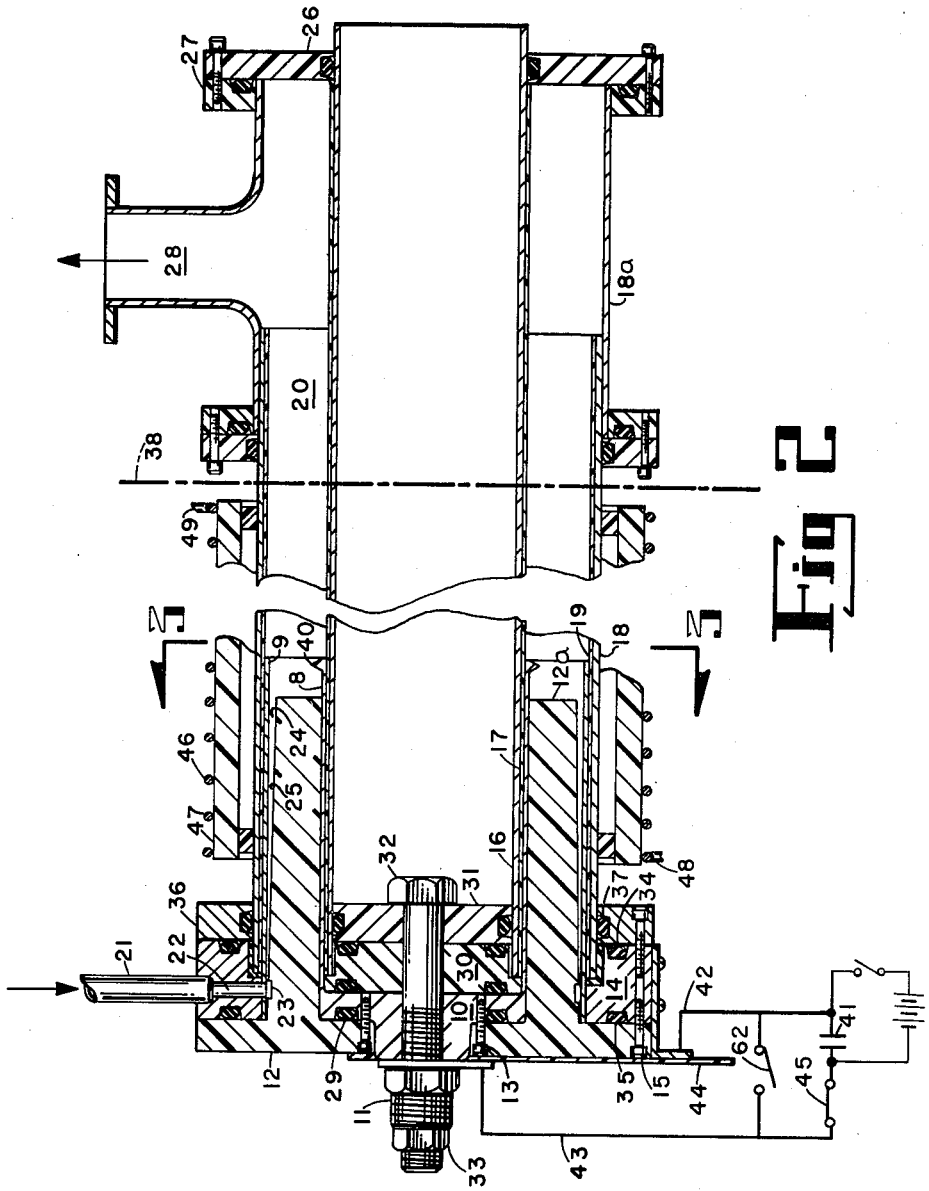

June 21, 1966   G. S. JANES ETAL   3,256,687
HYDROMAGNETICALLY OPERATED GAS ACCELERATOR PROPULSION DEVICE
Filed July 31, 1958   5 Sheets-Sheet 3

GEORGE SARGENT JANES
RICHARD M. PATRICK
INVENTORS

BY
ATTORNEYS

June 21, 1966     G. S. JANES ETAL     3,256,687
HYDROMAGNETICALLY OPERATED GAS ACCELERATOR PROPULSION DEVICE

GEORGE SARGENT JANES
RICHARD M. PATRICK
               INVENTORS

BY
               ATTORNEYS

June 21, 1966  G. S. JANES ETAL  3,256,687
HYDROMAGNETICALLY OPERATED GAS ACCELERATOR PROPULSION DEVICE
Filed July 31, 1958  5 Sheets-Sheet 5

GEORGE SARGENT JANES
RICHARD M. PATRICK
INVENTORS

BY
ATTORNEYS

United States Patent Office

3,256,687
Patented June 21, 1966

3,256,687
HYDROMAGNETICALLY OPERATED GAS
ACCELERATOR PROPULSION DEVICE
George Sargent Janes, South Lincoln, and Richard M. Patrick, Arlington, Mass., assignors to Avco Manufacturing Corporation, Cincinnati, Ohio, a corporation of Delaware
Filed July 31, 1958, Ser. No. 752,309
20 Claims. (Cl. 60—35.5)

The present invention relates to a gas accelerator and more particularly to a propulsion device which employs a magnetic field to produce a driving force for accelerating a mass of gas. The invention has widespread application in producing extremely high velocities in a gaseous medium and may be used to develop extremely high temperatures in such mediums. As a propulsion device, the invention is well adapted for use where a highly efficient device producing a low thrust is effective, as in vehicles designed for use outside of the earth's atmosphere.

The invention utilizes the principles of magnetohydrodynamics (which for convenience will be designated "MHD") and employs more specifically the phenomena of gaseous ionization in electric fields and charged particle movement under the combined influence of electric and magnetic fields.

In the propulsion field, chemical rockets utilizing propellants accelerated by heat energy have long held a position of importance. Because of weight limitations and low exhaust velocities, however, such propulsion devices are unsuited for distant travel outside of the earth's atmosphere. For such applications, attention has been turned to propellants which are ionized and accelerated by electric fields or to devices depending upon the reflection of solar radiation for the production of thrust.

Use of ionized propellants, as in an ion rocket, necessitates extraction of positive ions from an ionized plasma and their acceleration by an electrostatic field. As a result, electrons must be evaporated from such a device at the same rate as the positive ions are ejected from it in order to maintain electrical neutrality. This imposes limitations which are avoided through use of the present invention where the accelerating forces are applied to an electrically neutral ionized plasma by the use of magnetic rather than electrostatic fields.

Desiderata of a propulsion system are a small propellant mass and a small, lightweight power supply. Chemical rockets, although highly efficient, are characterized by a relatively low exhaust velocity, and hence require a relatively large propellant mass to produce a significant change of momentum. Ion rockets, on the other hand, are characterized by extremely high exhaust velocities, considerably in excess of the velocity of the associated vehicle, but produce only a modest momentum change since the weight of propellant ejected is quite small. Further, the energy that must be provided by the power supply, being proportional to the product of the mass of the propellant and the square of the exhaust velocity, is excessively large in proportion to the change of momentum produced. The present invention represents an improvement over both the chemical rocket and the ion rocket in providing a sufficiently large exhaust velocity to produce a useful change of momentum without producing such a large exhaust velocity as to require an excessively large power supply.

In general, use of a relatively sophisticated propulsion system of the type disclosed is justified where the total weight of the power supply and propellant is less than the weight of propellant required by a chemical rocket in travelling a comparable distance. Compared on a weight basis, the present invention is clearly more desirable for distant travel in outer space.

Briefly described, the invention comprises a pair of spaced, concentric, cylindrical electrodes between which a large electric field is established. The field is sufficiently large to initiate and maintain ionization of a gaseous medium introduced between the electrodes and, by imposition of an axial magnetic field normal to the electric field, circulation of electrons and ions in the space between the electrodes is established. This leads to complete breakdown and ionization of the medium throughout the space. As a result of ionization, the medium becomes electrically conductive and a radial current path is established between the electrodes. As the current flows through the electrodes and intervening ionized plasma, an associated magnetic field is established which is normal to and interacts with the current path. This interaction rapidly accelerates the ionized plasma through an annulus defined by insulated walls which are positioned in alignment with the electrodes.

The acceleration of the ionized plasma is so great that a shock wave is produced which is propelled along the annulus by the radial portion of the current discharge path. The current acts like a piston in trapping and sweeping before it all ionized particles and gas atoms, which are compressed behind the shock wave and rapidly rise in temperature and pressure to extreme values. The change of velocity imparted to the gas mass results in a change of momentum, imparting useful thrust to the device.

During the acceleration period, the current path and the shock wave are confined laterally by magnetic buffers which are established adjacent the insulated walls defining the annulus.

From the foregoing it will be understood that a broad object of the present invention is to provide an improved gas accelerator and more particularly an accelerator which is capable of producing shock waves in a gaseous medium yielding extremely high temperatures in excess of $10^6$° Kelvin.

Another broad object of the invention is to provide an improved propulsion device and more particularly one which produces thrust by acceleration of an electrically neutral plasma.

It is also an object of the invention to provide a valveless intermittent propulsion device.

A further object of the invention is to provide a propulsion device characterized by high efficiency and low weight.

A still further object of the invention is to provide means for accelerating a fully ionized plasma over a relatively long distance whereby significant accelerating forces are produced.

Other objects of the invention are as follows:

(a) Provision of means whereby uniform ionization of gas can be established and maintained between concentric electrodes.

(b) Provision of means for maintaining the continuity of an ionized current path during its elongation under the influence of a magnetic field associated with the flow of electrical energy through the path.

(c) Provision of an axial magnetic field for confining a discharge of electrical energy between electrodes positioned within the field.

(d) Provision of concentric electrical conductors within which image currents can be induced to establish magnetic fields for confining an electrically conducting path.

(e) Provision of means for containing a high velocity shock wave and associated high temperature and high pressure gases without loss to adjacent confining walls.

The novel features that are considered characteristic of our invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 2 is a longitudinal sectional view of a gas accelerator embodying the principles of the invention;

Figure 1:
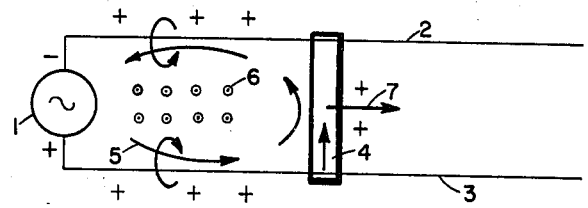
FIGURE 1 is a simplified diagram illustrating electromagnetic propulsion resulting from the interaction of an electrical conductor and a magnetic field.

An elementary understanding of certain basic principles employed in this invention can be gained from a study of FIGURE 1. This illustrates a direct current generator 1 which is connected across a pair of parallel, electrically conducting rails 2 and 3. Spanning the rails and slidable with respect thereto is a conductor 4. Current from the generator flows to the conductor and back to the generator by means of the rails, as indicated by the arrow 5.

As is well known in the art, there is associated with the current a magnetic field, indicated by conventional symbols, which emerges from the plane of paper within the space between the rails and conductor and which goes into the plane of the paper outside of the rails. Following conventional electrodynamic principles, the current flowing through the conductor 4 interacts with the magnetic field 6 producing a force, proportional to the cross product of the current and field, which acts in the direction indicated by arrow 7. In short, the interaction propels the conductor along the rails to the right of the figure.

In the present invention, the interaction of a current discharge along an ionized path interacts with an associated magnetic field to produce a rapid acceleration of gas, so rapid in fact as to produce a shock wave in the gas.

Figure 3:
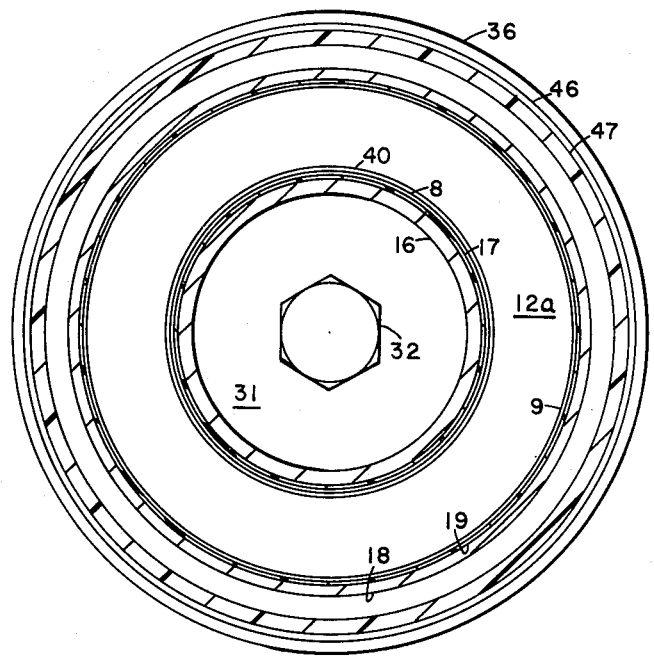
FIGURE 3 is a cross sectional view of the gas accelerator taken on plane 3—3 of FIGURE 2.

Attention should now be directed to FIGURES 2 and 3 which show a gas accelerator which may also be adapted for use as a propulsion device. The accelerator includes an inner cylindrical electrically conductive electrode 8 concentrically positioned within an outer electrode 9. Electrode 8 may be made integrally with an end cap 10 which includes a threaded extension 11 to which electrical connection may be made as will be explained. The electrodes are electrically isolated from one another by a cylindrical insulator 12 which may be secured to a supporting framework (not shown). The inner electrode may be secured to the insulator 12 by means of a plurality of cap screws, such as indicated at 13. The outer electrode 9 may also be secured to the insulator 12 by means of a conducting ring 14 which is brazed to the electrode and attached to the insulator, as by cap screws 15. Electrical connection is made to the outer electrode through the ring 14 as will be explained shortly.

Disposed within the inner electrode is a cylindrical shield 16 which is insulated from the electrode by a layer of insulating material 17.

Another cylindrical shield 18 surrounds the outside of electrode 9 and is insulated therefrom by insulating material 19.

It should be noted that the shields 16 and 18, and their associated insulating means 12, define between them an acceleration space or annulus 20 into which gas may be introduced as will now be explained.

The gas to be accelerated which, when the device is used for propulsion purposes constitutes the propellant, is introduced through pipe 21 which is securely fitted to ring 14. Communication is established from the pipe through passageway 22 to an annular groove 23 formed in the exterior of the insulator 12. The groove in turn communicates with a tapered flow channel 24 defined by the external tapered wall 25 of the insulator 12 and the interior cylindrical wall of electrode 9. Thus gas, introduced through pipe 21, may flow, via passageway 22, groove 23, and tapered passage 24, to the annulus 20.

Attention is now directed to the right hand end, as viewed in FIGURE 2, of the annulus 20. It will be noted that it is closed by cover plate 26 which spans the distance across the annulus and engages the inner shield 16. The cover plate is secured to a flange 27 which may be formed integrally with the extension 18a of shield 18. Connection is made to the annulus through passage 28 which is connected to vacuum pumps (not shown) which highly evacuate the annulus.

Since the annulus must be sealed against leakage, a plurality of O ring seals are provided between the various components at positions where gas leakage might occur. Thus an O ring 29 is provided between the cap 10 of the inner electrode and the adjacent face of insulator 12 as illustrated. To provide an effective seal, discs 30 and 31 are provided inside of shield 16 and are held securely in place by bolt 32 which passes centrally through the discs and is engaged by nut 33. Associated with the discs 30 and 31 are additional O ring seals.

Additional seal rings 34 and 35 are provided at points of leakage adjacent ring 14. A gland ring 36 is also bolted to ring 14 to position seal 37 adjacent the exterior of shield 18.

Obviously, when the accelerator is used as a propulsion device in outer space, no connection to vacuum pumps is necessary and the portion of the accelerator to the right of phantom line 38 may be eliminated since a vacuum would normally prevail in the environment with which the annulus 20 communicates.

The electrical portions of the accelerator may now be considered in greater detail. First, it is important to note that the inner and outer electrodes 8 and 9 extend into the annulus 20 beyond the end 12a of the insulator 12. Further, the inner electrode 8 may be provided with an outwardly extending annular spike 40 for promoting breakdown of gas introduced to the region between the extensions of the electrodes.

Electrical energy is supplied to the accelerator from a capacitor bank 41 which may be connected across conductors 42 and 43. Conductor 42 is electrically connected to ring 14 which in turn is connected to the outer electrode 9. On the other hand, conductor 43 is electrically connected to projection 11 which is integral with inner electrode 8 and its cap 10. The conductors are insulated from one another by a plate 44 which may be secured to the insulator 12.

In short, an electrically conductive path is provided between conductor 42 and the outer electrode and between conductor 43 and the inner electrode. Both electrodes are insulated from their surrounding components by the insulating materials 17 and 19, and insulator 12.

A switch 45 is provided in the conductor 43. When this switch is closed, the potential of charged condenser 41 is applied directly between electrodes 8 and 9.

In addition to the electrical portions of the accelerator already described, there is provided an axial solenoid or field coil 46, wound about a coil form 47, which may be supported in any suitable manner concentrically about shield 18. The ends 48 and 49 of the solenoid are connected to a D.C. source to establish an axial magnetic field as will be described shortly. The source of D.C. current for the field coil is not critical and may be chosen to provide flux concentration necessary for successful operation of the device.

The gaseous medium introduced to the annulus through pipe 21 may be methane, lithium, hydrogen, or any other gas which can be ionized and accelerated to produce a propulsive thrust. For convenience, hydrogen will be described as the gaseous medium.

In actual experiments using hydrogen at the gaseous medium, an 8 microfarad capacitor bank at 15 kv. was connected to the electrodes. In this way a large radial electric field in the order of $3 \times 10^4$ volts per centimeter was established in the annular space between the electrodes. The spike 40 associated with the inner electrode slightly reduces the radial spacing therebetween and develops a high electrical stress in the region immediately adjacent to it. Free electrons, which are normally present at least in a small number in any gas, are accelerated from the inner electrode, which serves as a cathode, to the outer electrode. By impingement with neutral atoms, the electrons produce ionization by collision, two electrons and a positive hydrogen ion resulting from each collision. Since the kinetic energy of an electron in collision with a gas molecule must exceed the ionization energy of the molecule before ionization can occur, a large electrical field is required.

The polarity of the electrodes is not critical since the accelerator will work properly regardless of which electrode serves as a cathode. For purposes of description, however, the inner electrode has been chosen as the cathode.

Before an ionized current discharge path can be developed in a previously insulating gas, current must build up by ionization from an extremely small initial value. In order to establish breakdown and ionization uniformly around the complete annulus between the electrodes, circulation of charged particles in the annular region is promoted by the imposition of an axial magnetic field normal to the electrical field. This magnetic field is created by current flow through field coil 46 and preferably should be of the order of $2 \times 10^3$ to $10^4$ gauss.

Figure 4:
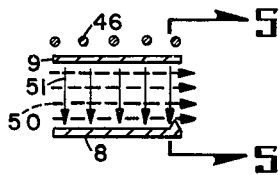
FIGURE 4 is a diagrammatic illustration of electric and magnetic fields which cooperate in producing uniform breakdown and ionization of a gaseous medium introduced between a pair of concentric electrodes.

Attention should now be directed to FIGURE 4 which shows in dash lines magnetic flux lines 50 passing axially through the annulus 20 between electrodes 8 and 9. Normal to the electrodes is the electrical field, indicated by vectors 51.

Figure 5:
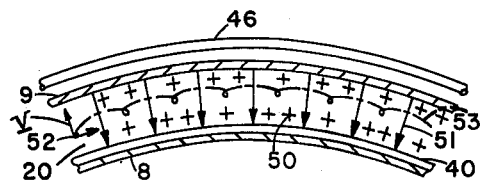
FIGURE 5 is a cross sectional view taken on plane 5—5 of FIGURE 4.

The flux lines 50 are indicated in FIGURE 5 by conventional notation. To illustrate the process of electrical breakdown, an electron 52 is assumed positioned in the annulus and moving radially outwardly with a velocity $v$. As a result of the combined influence of the electric and magnetic fields, the electron describes an arcuate path indicated by phantom line 53, the electron gradually drifting from the inner electrode 8 (cathode) to the outer electrode (anode) 9. The strength of the magnetic field imposed by field coil 46 is sufficient to make the gyro radius (cyclotron radius) of the electrons smaller than their mean-free path and the radial distance between the electrodes. Stated otherwise, the gyro frequency $$\omega = \frac{Be}{m}$$

of the electrons and time between collisions $$T = \frac{1}{N_A Q_{AE} v_e}$$

must be such that collision between the electrons and neutral atoms will occur before the electrons traverse the annular space between the electrodes.

The following symbols are used in the foregoing equations:

$B$ = Magnetic field strength of axial coil
$e$ = Electron charge
$m$ = Electron mass
$N_A$ = Number of atoms per unit volume
$Q_{AE}$ = Cross section of collision between the electrons and atoms
$v_e$ = Mean velocity of the electrons Motion of the electrons around the annulus, as has been described, and the resulting collisions with the hydrogen atoms provide uniform initial breakdown around the entire circumference of the electrodes. Positive ions will also circulate in the combined fields in the same direction as that for the electrons.

Figure 6:
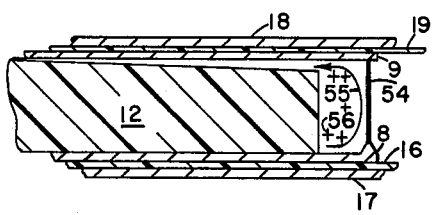
FIGURES 6 through 9 are diagrammatic illustrations of successive stages of current discharge along an ionized path between concentric electrodes.
Figure 7:
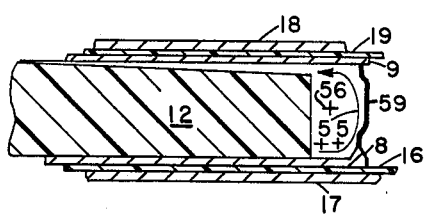
Figure 8:
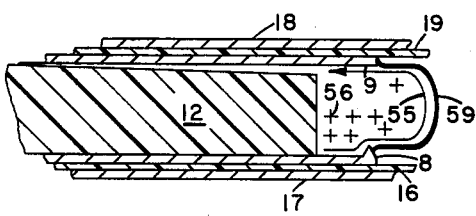
Figure 9:
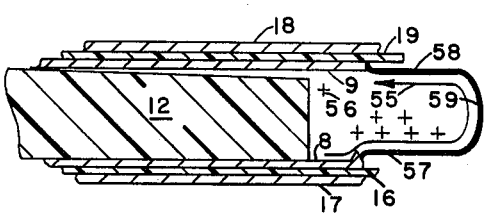

As is well known, an ionized gas is capable of conducting electric current, and a current discharge occurs, therefore, radially between the electrodes as indicated at 54 in FIGURE 6. As suggested by this figure, the electron current (see arrow 55), flowing axially along the electrodes and radially therebetween, sets up a circumferential or azimuthal magnetic flux 56. The interaction of the azimuthal flux and the current discharge path 54 in the ionized plasma produces an electrodynamic motor reaction which propels the current path to the right, as illustrated in the figure. As the path moves towards the right, it increases in axial length (see FIGURES 7 through 9) and is eventually defined by an inner sheet 57, an outer axial current sheet 58, and a radial current sheet 59 therebetween. Flow of current in the axial sheets also contributes to an azimuthal magnetic field which continuously accelerates the radial sheet 59. In this way, the ionized plasma is accelerated to the right and compresses the gas confined between the shields 16 and 18.

Figure 10:
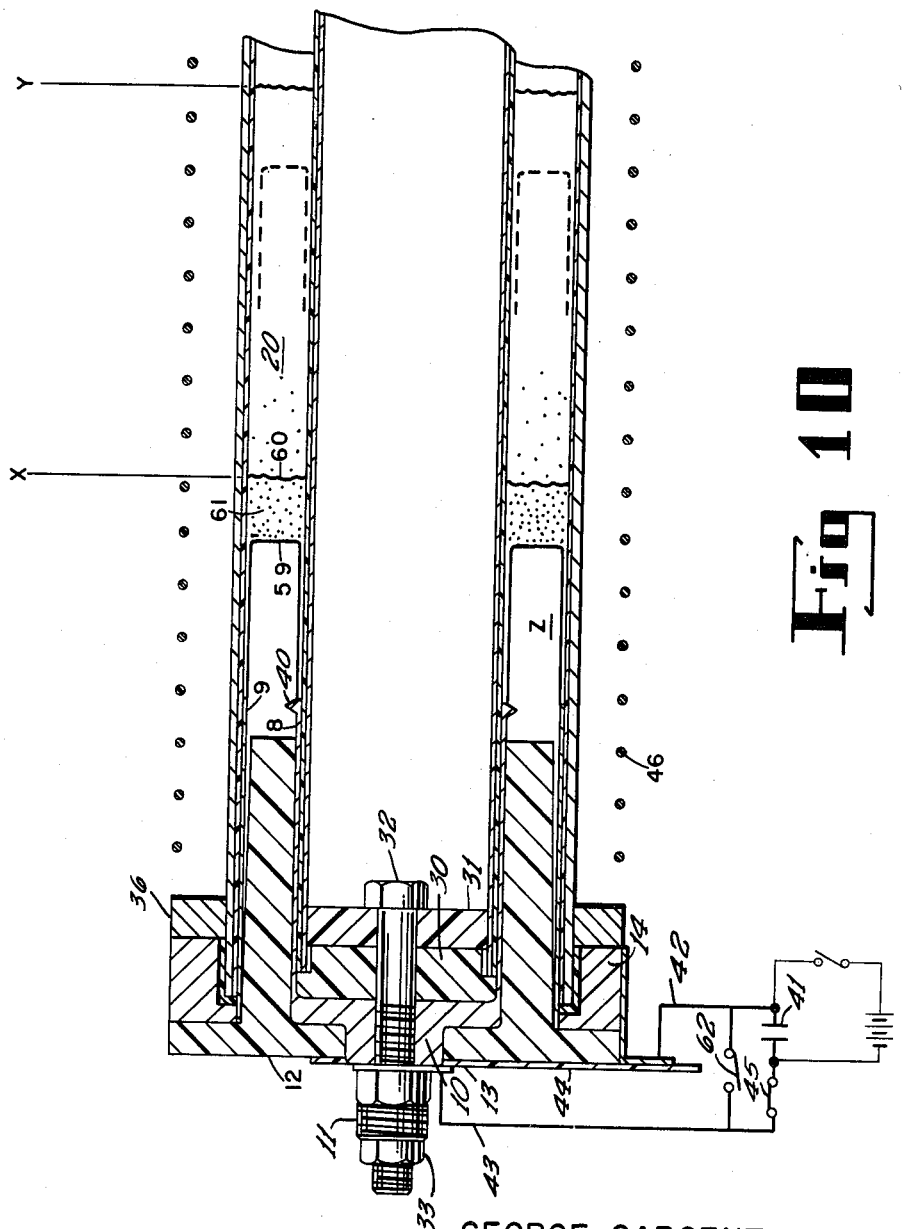
FIGURE 10 is a diagrammatic illustration of the gas accelerator showing the advance of a shock wave as it is propelled by an expanding magnetic field.

The radial current sheet advances so rapidly along the annulus that it creates before it a shock wave 60 shown in FIGURE 10. The gas 61 trapped between the advancing current sheet 59 and the shock wave rapidly increases in temperature and pressure to extremely high values. For propulsion applications the axial magnetic field strength is chosen at a sufficiently low value that the Alfven velocity $V_A$ $$V_A = \sqrt{\frac{B^2}{\mu_0 \rho_2}}$$

where:

$B$ = axial magnetic field strength
$\rho_2$ = gas density behind shock wave
$\mu_0$ = permeability of free space based on conditions behind the shock wave, is less than the gas velocity with respect to the shock wave. In this way the radial current sheet does not advance up to the shock front.

Although the axial magnetic field strength must be large enough to assure complete ionization of the gas between the electrodes, maximum efficiency leads to the use of a minimum value of axial field strength. The axial magnetic field must be large enough, however, to assure satisfactory confinement of the shock wave and current discharge path as will now be described.

During the acceleration process, radial motion of gas which has passed through the shock front is inhibited by the presence of the axial magnetic field produced by the field coil 46 (see FIGURE 2). Radial motion of the gas, which is electrically conductive by virtue of its extremely high temperature, in the presence of the axial magnetic field, produces an electromotive force in the azimuthal direction which forms current loops within the gas creating a force retarding the gas motion. These azimuthal current loops induce image currents, or eddy currents, in the electrically conductive, non-magnetic shields 16 and 18. Azimuthal currents flowing within the shields also set up an additional axial magnetic field which reinforces that established by the field coil 46. Thus, radial movement of the gas, either outwardly or inwardly, results in compression of the magnetic field between the gas and the adjacent shields. This provides an insulating layer of magnetic flux surrounding the gas and is of importance in preventing dispersion of the current sheets, shock wave, and associated hot gases into the surrounding confining walls (shields) defining the annulus.

In addition to the accelerating force in the axial direction resulting from the cross product of the current sheet with the azimuthal magnetic field, there is an accelerating force in the azimuthal direction due to the reaction between the radial current sheet and the axial magnetic field. Thus, the motion in the azimuthal direction of the gas behind the shock front is due to both viscous and electromagnetic forces. Since azimuthal components of motion do not contribute to propulsion and have associated with them certain energy losses, maximum efficiency dictates a minimum axial field, for propulsive applications.

Measurements have been made of the shock front velocity in an axial direction. The shock velocities were obtained by measuring the time required for the shock to propagate a known distance in the axial direction by recording the signals from various photomultipliers positioned to monitor the light emitted from the gas behind the shock at given locations. This was done by focusing the photomultipliers on the annulus through holes (not shown) provided in the outside shield 18.

Figure 12:
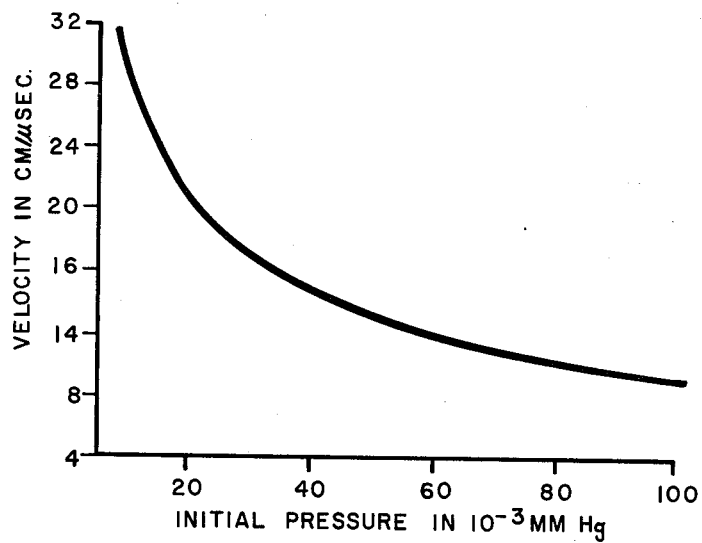

FIGURE 12 illustrates the maximum velocity of the shock theoretically attained during the acceleration process as a function of the initial pressure. The curve was calculated from the following expression:

$$\frac{B_\theta^2}{2\mu_0} = \frac{3}{4}\rho_1 u_s^2 + \rho_1 \int_0^t u\,du$$

where:

$u$ = shock velocity
$B_\theta$ = maximum magnetic field strength in azimuthal direction during capacitor bank discharge
$\rho_1$ = initial density
$t$ = time for initial breakdown Actual velocity measurements, based on 1.4 microsecond discharge time for an 8 microfarad 15 kv. capacitor bank, conform well to the theoretical curve.

In the foregoing expression $$\frac{B_\theta^2}{2\mu_0}$$

constitutes the magnetic pressure or driving force for propelling the gas. Shock tube investigations have demonstrated that the pressure behind a strong shock wave is very nearly proportional to $\rho_1 u_s^2$. The last term in the expression represents the force necessary to accelerate the mass of gas between the shock wave and the magnetic field and is usually equal to about $\frac{1}{10}\rho_1 u_s^2$ in the operating range of the device disclosed.

Attention should now be directed to FIGURE 10 which illustrates the gas accelerator in simplified form. It will be noted that the current path compresses before it a mixture of ions, electrons and neutral atoms at such a velocity as to create the shock wave 60. Between the current path and the shock wave, an equilibrium region exists at very high temperature and pressure. To the right of the shock wave, as viewed in FIGURE 10, the annulus is either evacuated or may have present in it specific gases at predetermined temperatures determined by particular experiments being performed. When the device is being used as a propulsion system, the annulus, in advance of the shock front, is normally evxacuated because it is in open communication with outer space.

For very strong shock waves in hydrogen, where the energy necessary for dissociation is small compared to the energy per particle, the gas density ratio across the shock front is equal to about 4:1 and the distance between the shock wave and the driving current is approximately ¼ of the distance that the shock wave has travelled during the acceleration process. Thus, in FIGURE 10, the shock wave is shown at position "X" at the time of maximum current flow from the condenser bank. The shock wave may attain a position "Y" after expansion of the azimuthal magnetic field. It will be noted that the distance between driving current and shock front gradually increases as the shock front propagates along the annulus.

Figure 11:
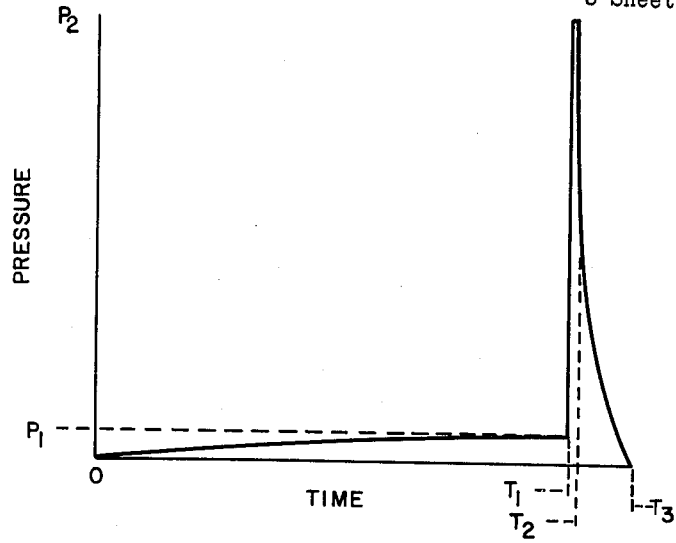
FIGURE 11 is a graph illustrating the pressure-time relationship of the gaseous medium within the gas accelerator; and, FIGURE 12 is a graph illustrating the relationship between the shock velocity and initial pressure of hydrogen when used as a gaseous medium within the accelerator.

FIGURE 11 illustrates a typical pressure-time relationship for gas at a point within the annulus, such as point "Z" of FIGURE 10 to the right of the electrodes. To facilitate illustration, the scale of the figure is distorted. At time $T=0$, the annulus may be evacuated and for purposes of FIGURE 11 is may be presumed that a propulsion cycle has just been completed. Gas is then introduced to the annulus, as has described with reference to FIGURE 2, causing a rise of pressure to $P_1$ during $T=0$ to $T_1$, a time period equal to about $3-5\times10^{-4}$ seconds. As the shock wave produced by the radial current sheet passes point Z, the pressure rises rapidly, almost instantaneously, from $P_1$ to $P_2$. During the time that the volume of gas between the shock wave and current sheet pass point Z, the pressure remains substantially constant. The time involved, being that from $T_1$ to $T_2$, is in the order of $10^{-6}$ seconds. After passage of the current sheet, the pressure gradually subsides to a zero condition at $T_3$ as indicated. To illustrate the rapidity with which the acceleration process occurs, it should be noted that the entire elapsed time from $T_1$ to $T_3$ is in the order of $2-3\times10^{-6}$ seconds.

The pressure may rise from one millimeter of mercury at $P_1$ to $40\times10^3$ millimeters of mercury at pressure $P_2$.

All of the foregoing values are illustrative only and will vary considerably depending upon the energy stored in the condenser, the particular gas used, and the initial conditions prevailing in the annulus. The values are typical, however, and illustrate that extreme pressure rise, and hence temperature rise, can be produced in extremely short time periods. This is of great value in experimental investigations of gas properties at high temperatures, heat transfer at high temperatures, and similar well known shock tube type experiments.

Since the gas in the equilibrium region behind the shock front attains very high temperatures, its electrical conductivity is sufficiently high to prevent the expanding azimuthal magnetic field from penetrating during the acceleration time. At the temperatures corresponding to equilibrium behind the shock front, with velocities corresponding to those of FIGURE 12, electrical conductivity of the gas varies between $3\times10^4$ mhos per meter and $4\times10^5$ mhos per meter. The skin depth of a substance having such conductivities, at a frequency where the quarter cycle time is in the order of one microsecond, is quite small and varies between 0.1 to 2.0 millimeters. For velocity conditions such as illustrated by FIGURE 12, the distance between the shock and current path varies between about 1 and 3 centimeters.

Consideration may now be given to the operation of the device shown in FIGURES 2 and 3 with the understanding afforded by the foregoing description. It will be assumed that at the beginning of an acceleration cycle the annulus 20 is evacuated and that the capacitor bank 41 has been fully charged by suitable current generating means (not shown). The gaseous medium flows through pipe 21 and its associated channels to the region of the annulus immediately adjacent the region where the electrodes 8 and 9 extend into the annulus. After gas has been introduced to approximately the first 10% of the annulus, switch 45 is closed to establish electrical discharge between the concentric electrodes. As has been described, ionization occurs completely around the annulus and a radial current sheet, with which is associated an azimuthal magnetic field, is created which rapidly propels before it the plasma of charged particles and remaining neutral atoms of gas. So rapid is the action that a shock wave is produced in advance of the radial current sheet. At the point of maximum current flow from the condenser, at a time when the potential across the condenser bank has fallen almost to zero, a direct short is created across conductors 42 and 43 by closing switch 62. At such time most of the energy originally stored in the condenser bank has been transferred to the magnetic field which is then allowed to expand in an axial direction along the annulus, accelerating the gas between the shock front and radial current sheet. The azimuthal magnetic field is allowed to expand to approximately 10 times its volume at the time of maximum current flow. The magnetic pressure, $$\frac{B_\theta^2}{2\mu_0}$$

being proportional to the square of the azimuthal field, decreases by a factor of 100, and the resulting total magnetic field energy integrated over the final volume being $\frac{1}{10}$ the energy originally imparted to the field by the capacitor bank. Since 10% of the energy remains in the residual field after the field expansion, 90% of the energy in the magnetic field is transferred into energy of the accelerated gas.

By virtue of the equation for magnetic pressure, it necessarily follows that the ratio between the final density in advance of the shock front to the density at the time of maximum azimuthal field must be equal to $10^{-2}$. This is accomplished by partially filling the annulus with gas at the beginning of the cycle and allowing the shock front and magnetic field to expand into a region of gradually decreasing gas density.

As a propulsion device the apparatus disclosed is quite efficient. Using radar pulse type capacitors which are commercially available, there is less than 1% dissipation of the mean power transferred through them. In addition to this loss, there is approximately a 1% power loss in the axial coil 46 and another 10% loss in the residual magnetic field at the end of the expansion cycle. As a result, the over-all efficiency may approach values of the order of 85–88%.

The principal weight of the propulsion system of this type is in the condenser bank. Such weight is not prohibitive, however, and even with condensers now available on the market, a weight of approximately 3 lbs. per kw. of power flow can be attained.

As illustrated by FIGURE 11, the entire operating cycle occurs very rapidly. A propulsion system of this type, although intermittent in operation, is characterized by such rapid accelerations of the gas within the annulus that no valve system is necessary for controlling introduction of the gas to the annulus. It is merely necessary to proportion the flow system so that approximately 10% of the annulus is filled with propellent gas during the time between acceleration cycles, i.e., successive discharges of the capacitor bank. The flow system is sufficiently restrictive and the rate of pressure rise within the annulus is sufficiently high that the pressure pulse from the annulus does not reflect significantly into the inlet system for introducing gas into the annulus.

The materials from which the device of FIGURE 2 may be constructed are not critical. Actual laboratory apparatus has employed electrodes of a sintered alloy of 80% tungsten and 20% copper or silver. Shields may be made from brass. All electrically insulating parts may be made from Lucite although it was found convenient to use Mylar sheet plastic as the insulating layer adjacent the shields.

From the foregoing description, it will be understood that the invention is of importance both as a laboratory instrument and as a propulsion device, the operating principles being essentially the same. Since the teaching of the invention may be used broadly for the purpose of gas acceleration, whether in a laboratory instrument or a propulsion device, the invention may be broadly referred to as a "gas accelerator."

The various features and advantages of the invention disclosed are thought to be clear from the foregoing description. Various other features and advantages not specifically enumerated will undoubtedly occur to those versed in the art, as likewise will many variations and modifications of the preferred embodiment of the invention illustrated, all of which may be achieved without departing from the spirit and scope of the invention as defined by the following claims.

We claim:

1. In a gas accelerator, a pair of spaced concentric electrodes, means for insulating said electrodes from each other, means associated with said electrodes for defining an annulus into which said electrodes extend, means for imposing a magnetic field axially through the annulus, said means forming the annulus comprising electrically conductive shields in association with insulating means insulating said shields from the annulus, means for introducing gas to the annulus adjacent the extension of said electrodes, and means for establishing an electric field radially between said electrodes whereby breakdown and ionization of the gas between said electrodes is established and a radial current sheet is formed, flow of current through said electrodes and current sheet creating an azimuthal magnetic field which interacts with the current sheet to propel it and the gas along the annulus, the axial magnetic field also serving as a magnetic buffer between the current sheet and said means defining the annulus.

2. In a propulsion system, a pair of concentric spaced electrodes, a cylindrical insulator between said electrodes, concentric shields defining an annulus concentric with said electrodes into which said electrodes extend, the exterior of said cylindrical insulator being tapered to present a passage of gradually increasing cross sectional area entering the annulus adjacent the extension of said electrodes, means for introducing a gaseous medium uniformly into the tapered passage remote from the extension of said electrodes, an insulating layer between said shields and the annulus, and means for establishing electric and magnetic fields in the space betwen said electrodes whereby the gaseous medium is ionized and propelled rapidly along the annulus away from said electrodes.

3. In a propulsion device for use in an evacuated environment, a pair of spaced concentric electrodes insulated from each other, shields associated with said electrodes for defining an annulus into which said electrodes extend, insulation between said shields and said electrodes and annulus, an axial coil concentric with said shields and extending for a length sufficient to establish a parallel magnetic field through the annulus, means for supplying direct current to said coil, energy storage means, means for connecting said energy storage means to said electrodes to establish an electric field therebetween, and means for introducing a propellant to the annulus adjacent the extension of said electrodes, the annulus remote from said electrodes being in free communication with the evacuated environment.

4. In a propulsion device for use in an evacuated environment, a pair of spaced electrodes, means defining a gas acceleration space into which said electrodes extend, said last-named means including an electrically conductive wall and insulating material between said conductive wall and the gas acceleration space, means for establishing an electric field between the extension of said electrodes, means for establishing a magnetic field at an angle to the electric field and through the gas acceleration space, and means for introducing a propellant to the gas acceleration space adjacent the extension of said electrodes.

5. Apparatus as defined in claim 4 in which said means for establishing the magnetic field through the gas acceleration space comprises a direct current field coil surrounding the gas acceleration space.

6. In combination in a gas accelerator, a high potential source of electric energy, concentric spaced electrodes, said source being electrically connected to said electrodes for establishing an electric field between said electrodes, means associated with said electrodes for defining an annulus into which said electrodes extend, means for imposing a magnetic field axially through the annulus, means for introducing a gaseous medium into the annulus adjacent the extension of said electrodes, and means for controlling the environment prevailing within the annulus.

7. Apparatus as defined in claim 6 in which at least one of said electrodes includes a circumferential spike extending across the annulus toward the other of said electrodes.

8. Apparatus as claimed in claim 6 in which said means for controlling the environment within the annulus comprises a vacuum pump.

9. In combination in a gas accelerator, a high potential source of electric energy, spaced electrodes defining an acceleration space, insulating means closing one end of said acceleration space to the surrounding environment, said electrodes being electrically connected to said high potential source, said source establishing an electric field between said electrodes, means for imposing a magnetic field through the space between said electrodes at an angle to the electric field, and means for introducing a gaseous medium to the space between said electrodes adjacent the closed end of the acceleration space whereby breakdown and ionization of the gas result from the combined action of the magnetic and electric fields, the ionized gas being accelerated through the acceleration space by the interaction of the electrical discharge through said electrodes and the magnetic field associated with the electrical discharge.

10. In combination in a gas accelerator for use with a source of electrical energy, a pair of spaced parallel electrodes defining an acceleration space, insulating means closing one end of said acceleration space to the surrounding environment, means for imposing a magnetic field through the acceleration space parallel to said electrodes adjacent their surfaces, means for introducing a gaseous medium to the region between said electrodes, and means for connecting the source of electrical energy to said electrodes for establishng an electric field across the magnetic field and causing breakdown and ionization of the gas between said electrodes by circulation of charged particles in the electric-magnetic fields, the ionized gas being accelerated from the acceleration space by the interaction of the electrical discharge through said electrodes and the magnetic field associated therewith.

11. In combination in a propulsion system, means defining a propellant acceleration space, means for introducing propellant to the space, means including a pair of opposed and parallel electrodes spaced one from another for discharging an electric current through the propellant in said acceleration space, and means associated with the acceleration space for confining the propellant as it is accelerated by the interaction of the electrical discharge and the magnetic field associated wth the electrical discharge.

12. In a propulsion device, electrically conductive nonmagnetic walls, electrical insulation adjacent said walls defining a propellant acceleration space, means for introducing a propellant into the acceleration space, means for discharging electrical energy through the propellant, the propellant being accelerated by the interaction of the electrical energy discharged and the magnetic field associated with the electrical discharge, and means for creating a magnetic field within the space substantially parallel to its defining walls for confining said propellant and electrical discharge.

13. In combination in a gas accelerator, means defining a gas acceleration space, means for introducing gas to the space, means including a pair of opposed and parallel electrodes spaced one from another for discharging an electrical current through the gas in said acceleration space, and means associated with the acceleration space for confining the gas as it is accelerated by the interaction of the electrical discharge and the magnetic field associated with the electrical discharge.

14. A hydromagnetic plasma accelerator comprising in combination a center electrode, an outer electrode coaxial with said center electrode and defining an annular vacuum chamber therebetween, insulating closure means between said electrodes at one end, means for introducing an ionizable gas into said annular vacuum chamber near one end thereof, and means including a power supply for applying a voltage between said electrodes at said end having said closure means, the open ends of said electrodes being adapted for connection to a vacuumed utilization chamber.

15. A hydromagnetic plasma accelerator comprising in combination a cylindrical center electrode, an outer cylindrical electrode coaxial with said center electrode and spaced therefrom to define an annular chamber, said annular chamber containing a hard vacuum, said electrodes defining a breech end and a muzzle end of said accelerator, an insulating and closure means betwen said electrodes at said breech end, means for introducing an ionizable gas into said annular chamber near said breech end, and means including a power supply for applying a voltage between said electrodes, at the muzzle end of said accelerator and at a time less than that required for said gas to diffuse to said muzzle end of said accelerator, to create a high frequency discharge current across said electrodes through said gas whereby said gas is ionized and propelled with high velocity from said muzzle end of said accelerator.

16. The plasma accelerator of claim 15 wherein said gas includes hydrogen and said gas is admitted to said annular chamber.

17. The plasma accelerator of claim 16 in which said gas is admitted into said annular chamber at a point behind said breech end of said accelerator.

18. The plasma accelerator of claim 16 in which said gas is admitted adjacent to said breech end of said accelerator.

19. The plasma accelerator of claim 15 in which said gas includes hydrogen and said gas introducing means admits said gas into said annular chamber through said outer electrode.

20. The plasma accelerator of claim 19 in which said gas is admitted at a point behind said breech end of said accelerator.

References Cited by the Examiner

UNITED STATES PATENTS

| | | | |
|---|---|---|---|
| 2,146,025 | 2/1939 | Penning | 250—41.9 |
| 2,282,401 | 5/1942 | Hansell | 230—69 |
| 2,581,970 | 1/1952 | Partiot | 315—111 X |
| 2,757,306 | 7/1956 | Conn et al. | 313—156 |
| 2,798,181 | 7/1957 | Foster | 313—161 |
| 2,819,423 | 1/1958 | Clark | 313—231 |
| 2,826,708 | 3/1958 | Foster | 313—63 X |
| 2,831,996 | 4/1958 | Martina | 313—63 |
| 2,940,011 | 6/1960 | Kolk | 315—111 |
| 2,961,559 | 11/1960 | Marshall | 313—63 |
| 2,992,345 | 7/1961 | Hansen | 313—63 |

(Other references on following page)

OTHER REFERENCES

Butz: Controlled Fusion Studies Open Space Engine Field, Aviation Week, May 19, 1958, pages 50–57.

Kolb: Production of High-Energy Plasmas by Magnetically Driven Shock Waves, Physical Review, vol. 107, No. 2, July 15, 1957, pages 345–50.

GEORGE N. WESTBY, *Primary Examiner.*

FREDERICK M. STRADER, RALPH G. NILSON, ARTHUR GAUSS, *Examiners.*

R. A. VAN KIRK, V. LAFRANCHI,
*Assistant Examiners.*